United States Patent
Klobucar et al.

(10) Patent No.: US 8,062,025 B2
(45) Date of Patent: Nov. 22, 2011

(54) INJECTION MOLDING APPARATUS HAVING A ROTATING VANE

(75) Inventors: Peter Klobucar, Georgetown (CA); Bruce Catoen, Georgetown (CA); Rhonda Goslinski, Guelph (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 53 days.

(21) Appl. No.: 12/641,832

(22) Filed: Dec. 18, 2009

(65) Prior Publication Data

US 2010/0159062 A1 Jun. 24, 2010

Related U.S. Application Data

(60) Provisional application No. 61/139,273, filed on Dec. 19, 2008.

(51) Int. Cl.
B29C 45/20 (2006.01)
(52) U.S. Cl. .......... 425/549; 425/564; 425/572
(58) Field of Classification Search .......... 425/549, 425/562, 563, 564, 565, 566, 572
See application file for complete search history.

(56) References Cited

U.S. PATENT DOCUMENTS

| | | | |
|---|---|---|---|
| 3,488,810 A * | 1/1970 | Gellert | 425/563 |
| 4,723,898 A | 2/1988 | Tsutsumi | |
| 5,149,547 A * | 9/1992 | Gill | 425/562 |
| 5,334,008 A | 8/1994 | Gellert | |
| 6,200,126 B1 | 3/2001 | Lohl | |
| 6,344,164 B1 | 2/2002 | Tyler et al. | |
| 6,468,464 B1 | 10/2002 | Eckardt et al. | |
| 7,393,198 B2 | 7/2008 | Niewels et al. | |
| 2007/0065538 A1 | 3/2007 | Weatherall et al. | |
| 2007/0077328 A1 | 4/2007 | Olaru et al. | |

FOREIGN PATENT DOCUMENTS

| | | |
|---|---|---|
| EP | 0 614 743 A1 | 9/1994 |
| EP | 0 750 975 A1 | 1/1997 |
| EP | 1 022 111 A1 | 7/2000 |
| GB | 1125727 A | 8/1968 |
| JP | 2-178012 A | 7/1990 |
| JP | 5-37809 B2 | 6/1993 |
| JP | 5-200788 A | 8/1993 |
| JP | 9-254209 A | 9/1997 |
| JP | 9-262872 A | 10/1997 |
| JP | 10-006363 A | 1/1998 |
| JP | 11-156895 A | 6/1999 |
| JP | 2005-193632 A | 7/2005 |
| KR | 10-2007-0056321 A | 6/2007 |

OTHER PUBLICATIONS

EP Search Report in EP Appl No. 09015732.2-2307 May 3, 2010.

* cited by examiner

*Primary Examiner* — Tim Heitbrink
(74) *Attorney, Agent, or Firm* — Medler Ferro PLLC

(57) ABSTRACT

An injection molding apparatus includes a manifold defining a manifold channel for receiving pressurized molding material from an upstream source and a nozzle defining a nozzle channel in communication with the manifold channel to define a flow channel. The nozzle is associated with a mold gate of a mold cavity and delivers molding material to the mold gate. A vane, such as that of an impeller or screw, is rotatably disposed in the flow channel upstream of a mold gate. A motor is coupled to the vane and rotates the vane in either direction. Rotation of the impeller or screw can be automatically adjusted by a controller and a sensor that measures pressure, temperature, or other property of the molding material.

12 Claims, 11 Drawing Sheets

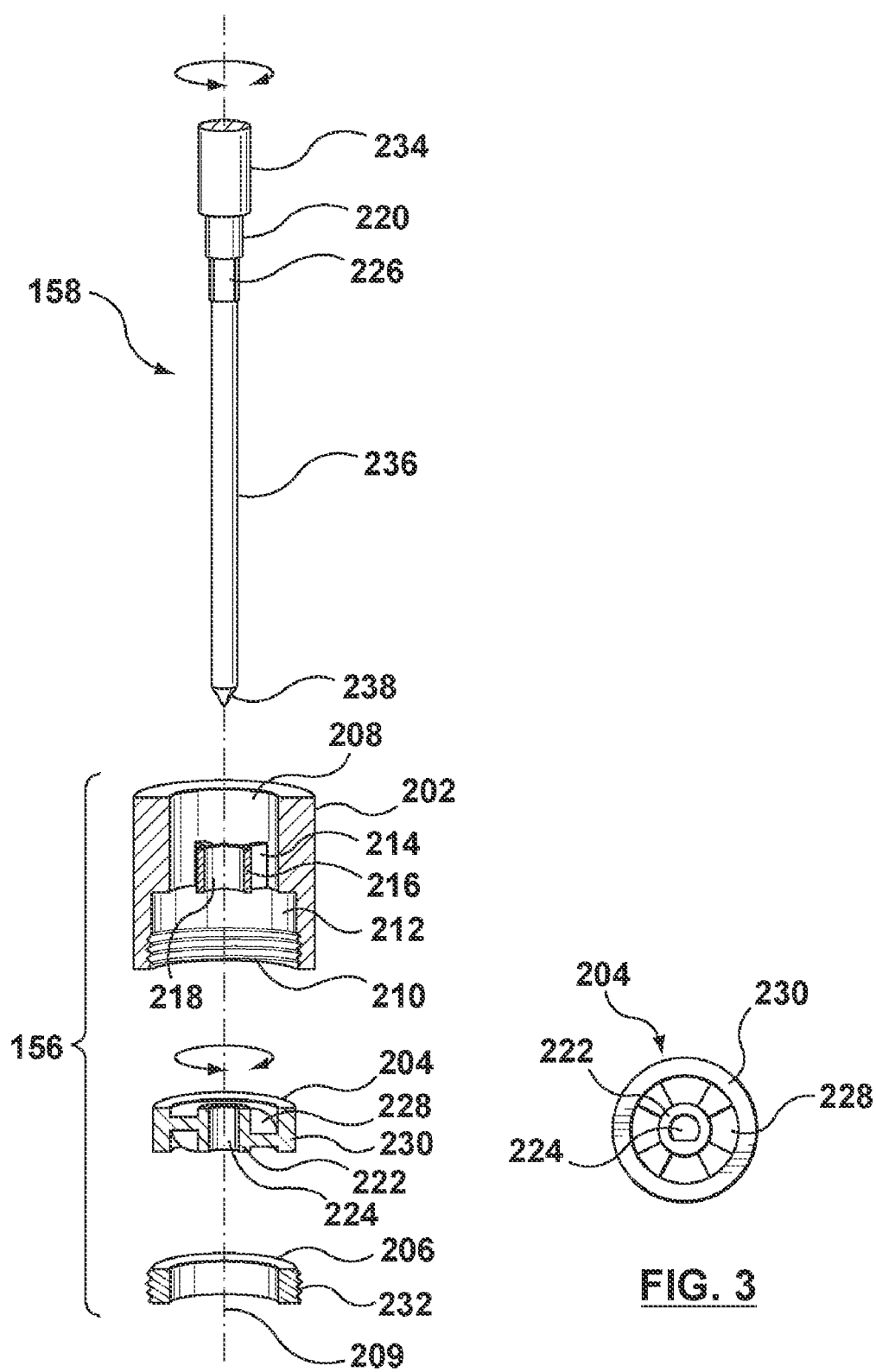

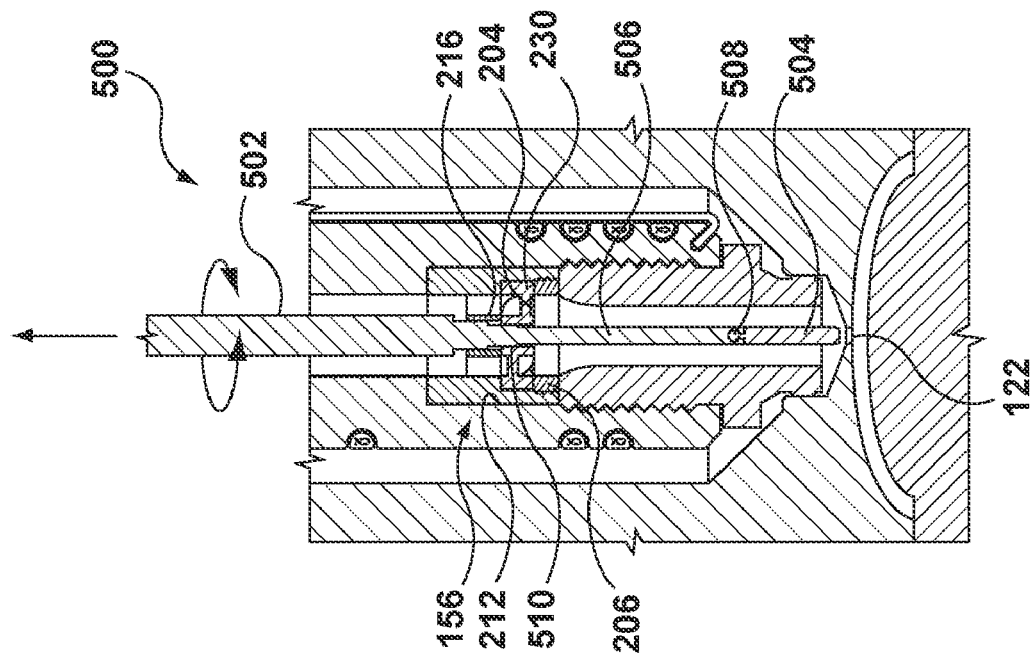
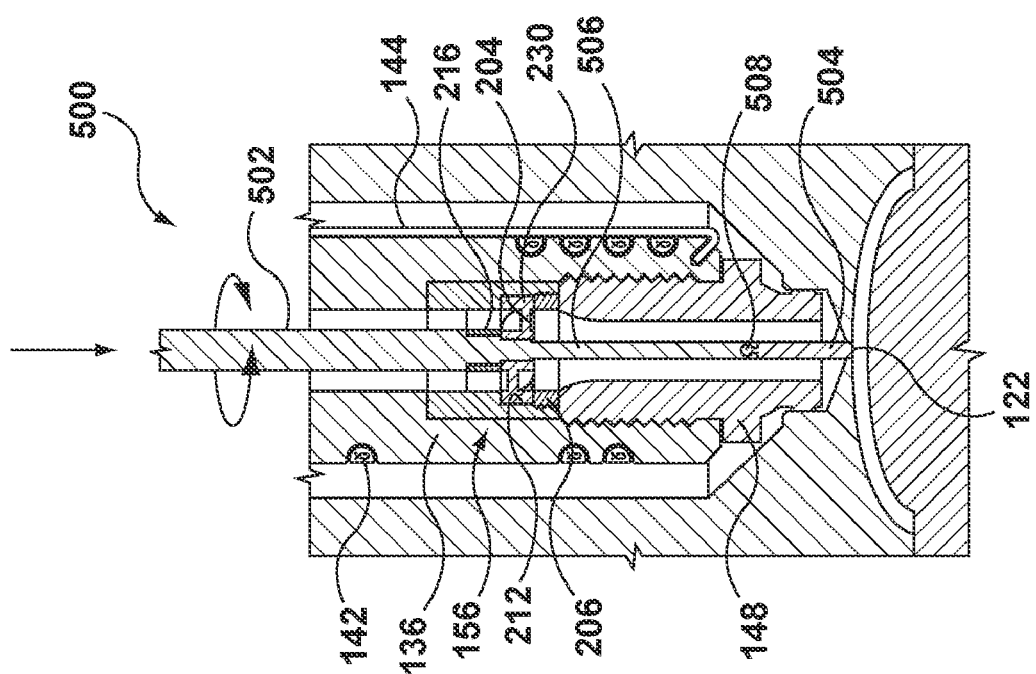

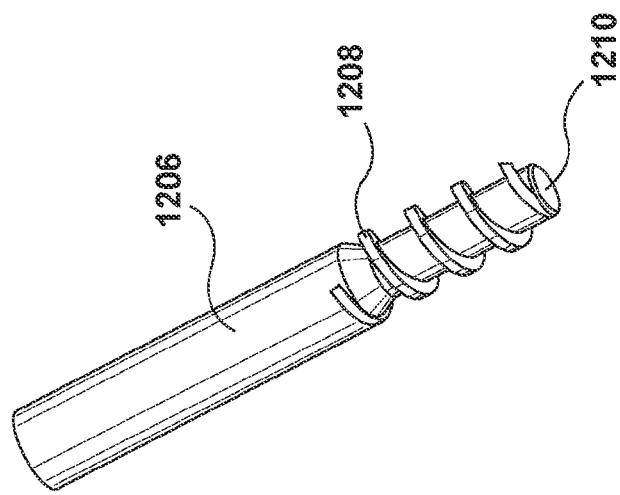
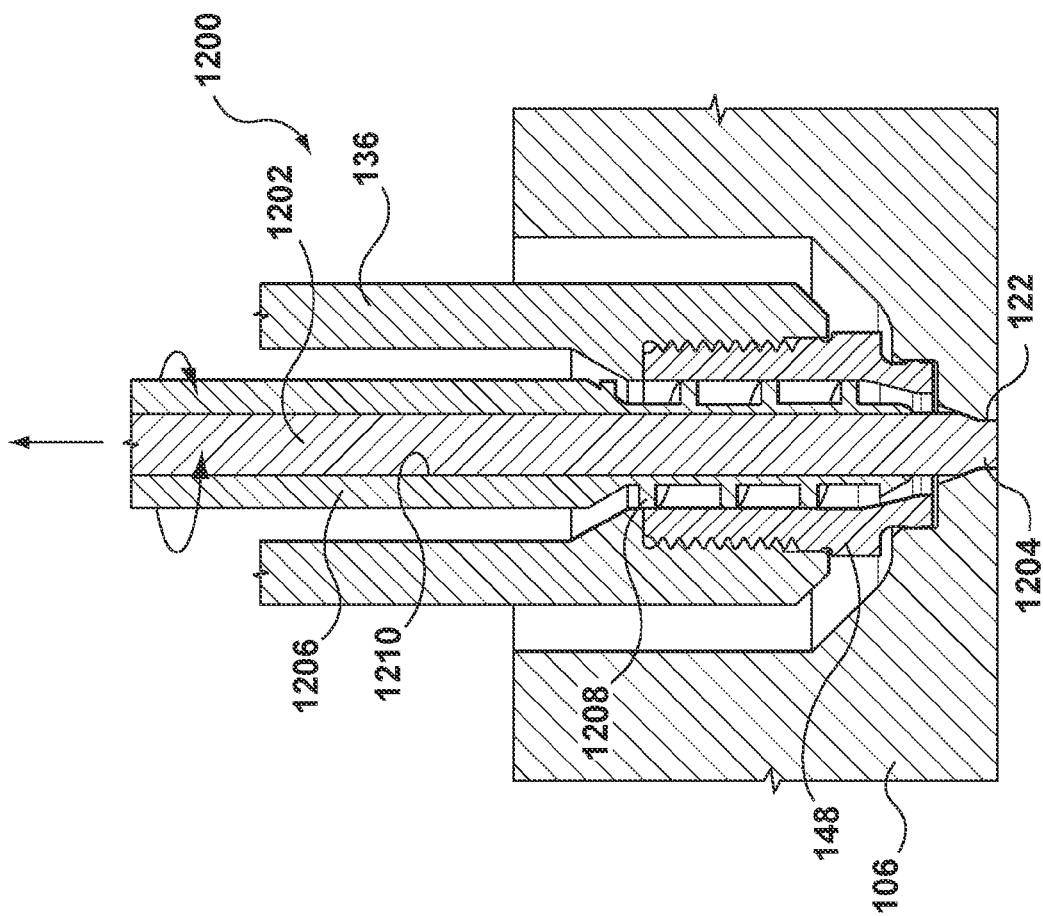

US 8,062,025 B2

INJECTION MOLDING APPARATUS HAVING A ROTATING VANE

CROSS-REFERENCE TO RELATED APPLICATION

This application claims the benefit under 35 U.S.C §119(e) of U.S. Appl. No. 61/139,273 filed Dec. 19, 2008, which is incorporated by reference herein in its entirety.

FIELD OF THE INVENTION

The present invention relates to injection molding, and more particularly, to an injection molding apparatus having a rotating vane and method of operating such an apparatus.

BACKGROUND OF THE INVENTION

Injection molded part quality can be affected by many factors.

For example, when molding material flows around an obstruction in a melt channel such as a valve pin, other obstruction, it sometimes cannot merge or knit back together very well on the other side of the obstruction. Many times the result is a so-called knit-line appearing on a molded part as a visible line or a weak area in the molded part susceptible to failure under stress. It is difficult to predict the severity of knit-lines in parts before they are molded.

Another problem occurs when changing between batches of differently colored molding material. Parts may have specks or streaks of the old material long after the new material has been introduced. Color changes can be addressed by designing flow channels to discourage material stagnation. However, in many cases, stagnation cannot be totally eliminated.

Improper decompression of molding material may also cause problems. In a decompression phase of an injection cycle, a plasticizing screw of an injection molding machine is retracted after the mold gate freezes. This action is also known as suck-back. Such plasticizing screw movement is sometimes necessary to allow residual holding pressure to be relived from the hot runner or other portion of the flow channel. Stringing or pulling of molding material from the mold gates can occur when the mold is opened to eject the newly molded articles if residual pressure in the flow channel is too high. The decompression phase of an injection cycle is time dependent and is sometimes ineffective when the flow channel is long or narrow. Increasing the decompression phase of the molding cycle may disadvantageously increase the total cycle time.

BRIEF SUMMARY OF THE INVENTION

Embodiments hereof are directed to an injection molding apparatus having a vane, such as that of an impeller or screw, which is rotatably disposed in a molding material flow channel upstream of a mold gate. A motor is coupled to the vane and rotates the vane in either direction.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

FIG. 2 is an exploded partial sectional view the impeller assembly shown in FIG. 1.

FIG. 3 is a top view of the impeller of FIG. 2.

FIGS. 5A and 5B are sectional views of a valve-gated embodiment of the present invention.

FIG. 12A is a partial sectional view of another valve-gated embodiment of the present invention. FIG. 12B is a perspective view of the impeller of FIG. 12A

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
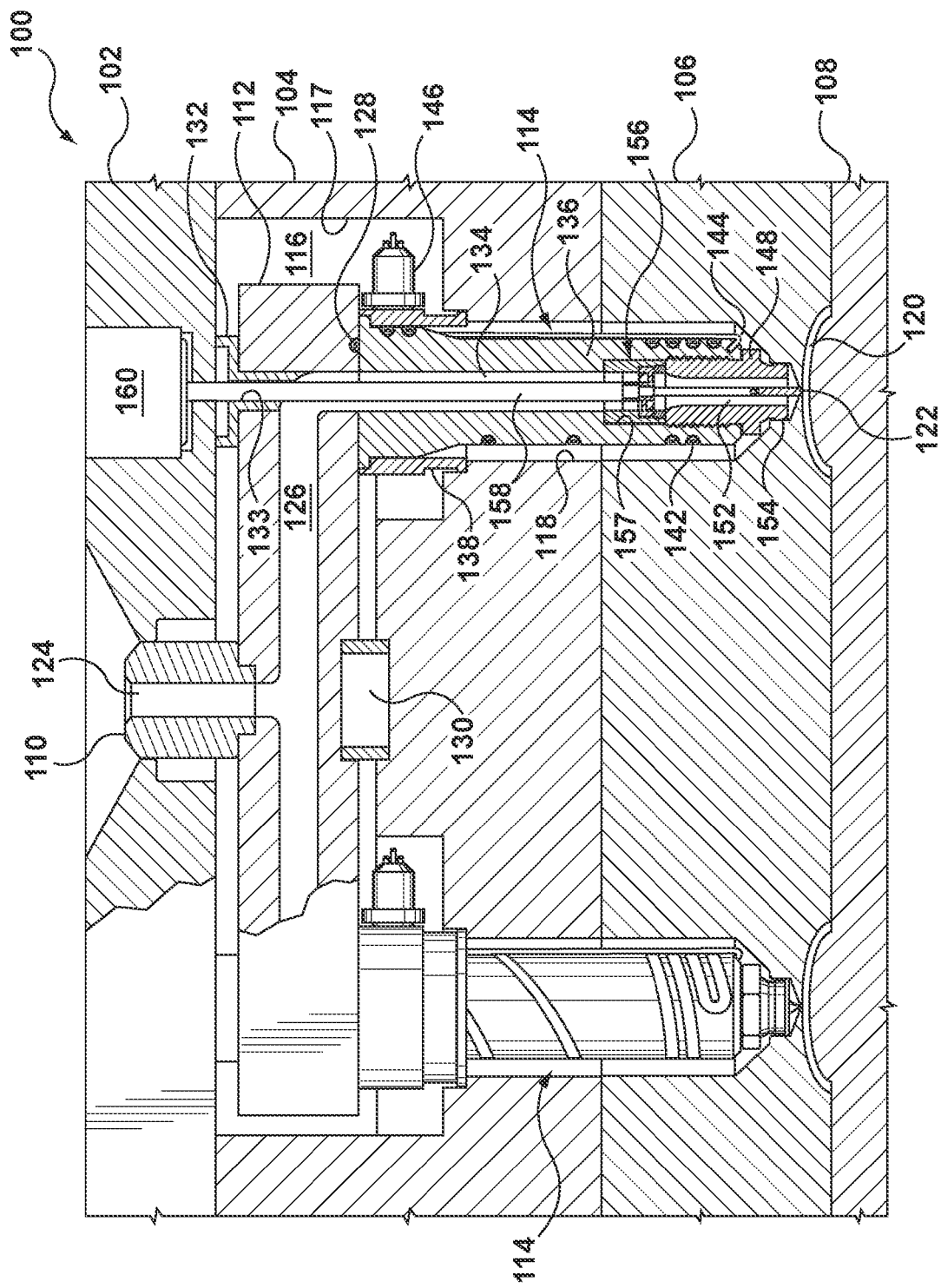
FIG. 1 is a partial sectional view of an injection molding apparatus according to an embodiment of the present invention.

Embodiments hereof relate to, among other things nozzles and components which can be used in an injection molding apparatus such as the injection molding apparatus 100 shown in FIG. 1. The features and aspects described for the other embodiments can be used accordingly with the present embodiment. In the following description, "downstream" is used with reference to the direction of mold material flow from an inlet of the injection molding system to a mold cavity, whereas "upstream" is used with reference to the opposite direction. Similarly, "forward" is used with reference to a direction towards a parting line between a mold cavity plate and a mold core, whereas "rearward" is used with reference to a direction away from the parting line.

Injection molding apparatus 100 includes a back plate 102, a mold plate 104, a cavity plate 106, a core plate 108, an inlet component 110, a manifold 112, and a plurality of nozzles 114. Injection molding apparatus 100 may include any number of manifolds and nozzles, in any configuration. In this embodiment, one manifold is shown for simplicity. Injection molding apparatus 100 may include additional components, such as plates, alignment dowels, mold gate inserts, and cooling channels, among others.

Back plate 102 has a central opening that accommodates inlet component 110. An air space 116 for accommodating manifold 112 is defined by back plate 102 and a pocket 117 in mold plate 104. Pocket 117 also partially defines nozzle wells 118 for accommodating nozzles 114. Cavity plate 106 further defines nozzle wells 118, partially defines mold cavities 120, and defines mold gates 122 leading into mold cavities 120. Bolts (not shown) are generally used to sandwich the plates together. There are many configurations of back plate 102, mold plate 104, and cavity plate 106, and the shapes and sizes of these plates may be varied. The particular number of plates used is not significant, and more or fewer plates than shown may be used.

Core plate 108 further defines mold cavities 120, in which injection molded products are formed. Core plate 108 can be separated from cavity plate 106 to eject such products, using pins, strippers, etc. (not shown), as known to those skilled in the art. As with cavity plate 106, the design of core plate 108 may be varied.

Inlet component 110 includes an inlet channel 124 for receiving pressurized molding material (e.g., plastic melt) from an upstream source, such as a plasticizing screw of an injection molding machine (not shown).

Manifold 112 defines a manifold channel 126 and includes a manifold heater 128. Manifold channel 126 receives a stream of molding material from inlet channel 124 and distributes the molding material to nozzle channels 134 in nozzles 114. Manifold heater 128 can be of any design, such as the embedded insulated resistance wire illustrated. Manifold 112 is thermally insulated by air space 116 which is defined by pocket 117 and back plate 102. Manifold 112 is offset from mold plate 104 by nozzles 114 and a locating ring 130, which also locates manifold 112 in the correct position. Manifold 112 is offset from back plate 102 by bushings 132, which may be designed like valve pin bushings.

Nozzles 114 are coupled to manifold 112 and are seated in nozzle wells 118. Air in nozzle wells 118 serves to insulate nozzles 114 from the surrounding plates. Each nozzle 114 is associated with a mold gate 122 and defines a nozzle channel 134 in fluid communication with manifold channel 126 for delivering molding material to mold gate 122. Each nozzle 114 includes a nozzle body 136, a nozzle flange 138 for locating and supporting nozzle body 136 in nozzle well 118, a nozzle heater 142 embedded in nozzle body 136, a nozzle thermocouple 144, a terminal end 146 for routing wiring of the heater 142 and thermocouple 144 to a controller (not shown), and a removable nozzle tip 148. Nozzle heater 142 can be of any design, such as the embedded insulated resistance wire illustrated. Nozzle tip 148 defines a tip channel 152 that forms part of nozzle channel 134. Nozzle tip 148 is threaded to nozzle body 136 and includes a circumferential sealing surface 154 for sealing off nozzle well 118 against backflow of molding material. Tip 148 of injection molding apparatus is shown as a one-piece tip, however tip 148 may be made from multiple pieces.

Nozzles 114 in combination with manifold 112 may be referred to as a hot runner system. Inlet channel 124, manifold channel 126, nozzle channels 134, plus any additional channels leading to mold gate 122 may be collectively referred to as a flow channel.

In this embodiment, an impeller assembly 156 is provided in a forward bore 157 of the nozzle body 136 and is held in place by the nozzle tip 148. Impeller assembly 156 is powered by a pin 158 that extends from a motor 160, through bushing 132, and to mold gate 122. Motor 160, situated in back plate 102, may be a servomotor, or any other type of motor capable of imparting rotational movement to pin 158. Bushing 132 includes a disc-shaped main body and a cylindrical bushing portion connected to and extending from the main body and into manifold 112. Bushing 132 includes a bore 133, which creates a seal against melt flow with pin 158 while still allowing pin 158 to slide in an axial direction. Impeller assembly 156 has at least one rotating vane. The vane can be rotated by motor 160 in a first direction that tends to reduce the pressure of the molding material on the downstream side of impeller assembly 156 for the purpose of, for example, decompressing molding material near mold gate 122. Motor 160 may also be configured to rotate the vane in a second direction that tends to increase the pressure of the molding material on the downstream side of impeller assembly 156 if, for instance, additional packing of molding material in cavity 120 is required. Motor 160 can be switchable between the first and second directions. Impeller assembly 156 may also serve to mix the molding material, to reduce the prominence of knit-lines, to blend additives, nonlimiting examples including color and strengthening additives, or to reduce zones of flow stagnation when molding material is to be changed, such as for color change. Impeller assembly 156 may be used for other purposes as well, with the time, duration, and direction(s) of rotation being selected accordingly.

During operation, melt stream of molding material is injected into inlet component 110 and flows in a downstream direction through heated manifold 112 and nozzles 114, to mold gates 122, and into mold cavities 120. Impeller assembly 156 may be powered to rotate in either direction at any time before, during, or after injection. When molding material in mold cavities 120 solidifies, core plate 108 is withdrawn from cavity plate 106 and the finished products are ejected, thus completing one cycle of a series of injection cycles.

If pin 158 or impeller assembly 156 need to be disassembled for maintenance or any other reason, pin 158 can be pulled out in rearward direction and impeller assembly 156 can be slid out of the downstream end of nozzle 114 after removing nozzle tip 148.

FIG. 2 is an exploded partial sectional view of impeller assembly 156, including a downstream portion of pin 158. Impeller assembly 156 includes an impeller bushing 202, an impeller 204, and a removable locking ring 206.

Impeller bushing 202 is designed to be coupled to nozzle 114 and held in place by, for example, a nozzle tip (not shown). Impeller bushing 202 is a generally cylindrical hollow body that defines a through-bore 208 that allows passage of molding material through impeller bushing 202. A downstream counter bore has an internal thread 210 and defines an inside track 212. One or more vertically aligned stationary fins 214 extend radially from the inside wall of through-bore 208 in impeller bushing 202 towards the centerline 209 and centrally hold a hollow cylindrical collar 216. In other embodiments, stationary fins 214 may be flat and angled or have curvature. Collar 216 has a circular opening 218 for engaging a complementary circular cross-section 220 of pin 158 for bracing pin 158 against lateral movement, while allowing pin 158 to rotate about its longitudinal axis which is concentric with centerline 209 in the present embodiment.

Impeller 204 has a hub 222 having a central opening 224 of non-circular cross-section for engaging a like cross-section 226 of pin 158, which thus serves to rotationally couple impeller 204 to motor 160. At least one vane 228 extends radially outward from hub 222 and has an end connected an outer ring 230. Vanes 228 may be curved, as shown, or flat.

The curvature or angle of vanes 228 can be designed taking into account the properties of the molding material, the shape of stationary fins 214, and the expected duties and service conditions of impeller 204. In some cases, such as mixing without inducing pressure, vertically aligned impeller vanes may suffice. In this embodiment, four curved vanes 228 having an average angle of attack of about 45 degrees relative to centerline 209 are used. When assembled, outer ring 230 is rotatably disposed in inside track 212 of impeller bushing 202. The fit of outer ring 230 in inside track 212 provides sufficient clearance between an outside surface of outer ring 230 and inside track 212 of impeller bushing 202 to allow the impeller 204 to rotate by rotating pin 158 as indicated by the arrows. Such clearance can be achieved by making inside track 212 of impeller bushing 202 suitably larger than outer ring 230 of impeller 204, taking into account thermal expansion due to operating conditions. Generally, when installed, impeller 204 is rotatably disposed in the flow channel upstream of mold gate 122.

Removable locking ring 206 has an external thread 232 for coupling with thread 210 of impeller bushing 202. Removable locking ring 206 serves to define a downstream end of inside track 212 and facilitate insertion and removal of impeller 204. A tool engagement feature (not shown), such as a slot, may be provided on a downstream end of locking ring 206.

The materials of impeller bushing 202, impeller 204, and locking ring 206 can be selected with rotation of impeller 204 in mind. For example, impeller 204 may be made of a material dissimilar to the material of impeller bushing 202 or locking ring 206 to prevent galling or seizure of impeller 204 in inside track 212. Low-friction materials, such as fluorocarbon resin (e.g., TEFLON), may be used to make impeller bushing 202, impeller 204, and/or locking ring 206 or coatings of low-friction materials may be applied to one or more of these components. However, using dissimilar or low-friction materials is optional. The molding material itself may provide lubrication as well.

When rotated, impeller 204 can increase the pressure and/or flow of the molding material. A pressure increase may be upstream or downstream of impeller 204 depending on the direction of rotation, and a pressure decrease would exist on the opposite side. This pressure gradient becomes superimposed on the pressure gradient of the flowing molding material. Unlike a screw propeller, an impeller is not a positive displacement device, which means that an impeller need not be rotated to accommodate flow of molding material. For example, an impeller can be run in a direction against the flow of molding material without actually reversing the flow of molding material, i.e., the pressure gradient generated by the impeller can tend to reverse the flow of molding material without being strong enough to actually reverse the flow of molding material.

Also shown in FIG. 2 are a larger section 234 and a smaller section 236 of pin 158. The stepped geometry of pin 158 allows the pin 158 to be rearwardly withdrawn from impeller assembly 156, while at the same time prevents pin 158 from being pushed too far into the nozzle. The downstream end of pin 158 has a torpedo tip 238 that sits adjacent mold gate 122 during use for conducting heat toward mold gate 122.

FIG. 3 shows a top view of impeller 204. Visible in this view is the shape of non-circular opening 224.

Figure 4:
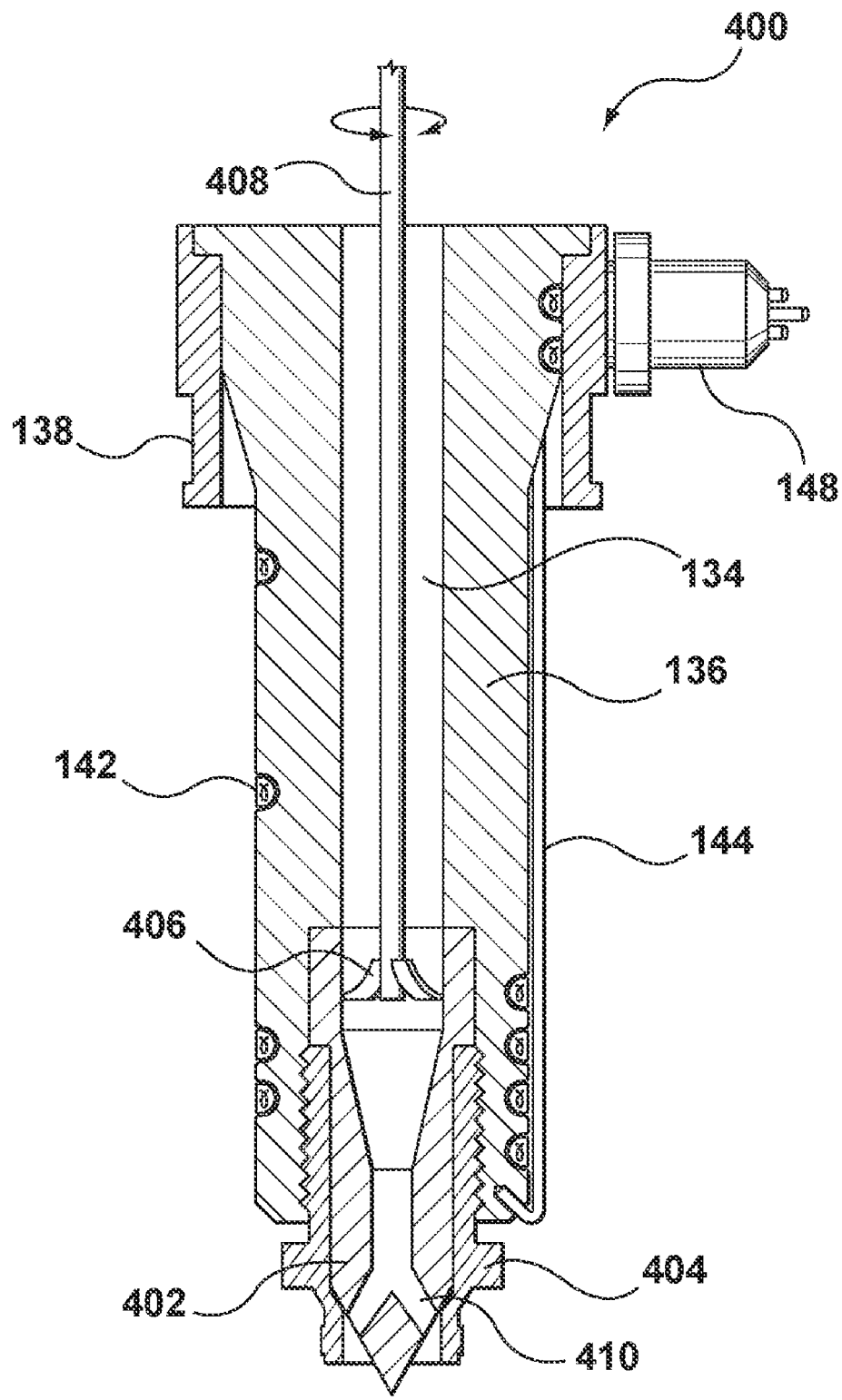
FIG. 4 is a partial sectional view of a nozzle according to another embodiment of the present invention.

FIG. 4 shows a nozzle 400 according to another embodiment of the present invention. The features and aspects described for the other embodiments can be used accordingly with the present embodiment. Reference numerals from FIG. 1 have been used to indicate like parts, and the relevant description can be referenced.

The nozzle 400 has a removable tip 402 held to the downstream end of nozzle body 136 by a threaded tip retainer 404. The tip 402 has at least one diverted tip channel 410. Nozzle 400 can be used in an injection molding apparatus, such as that shown in FIG. 1.

Curved vanes 406 are disposed in nozzle channel 134 and fixed to a pin 408 which couples vanes 406 to a motor (not shown), for example motor 160 of FIG. 1. The motor can rotate vanes 406 in either direction as indicated by the arrow. In other embodiments, vanes 406 can form part of an impeller or made longer to form part of a screw.

Operation of nozzle 400 is the same as described for the other embodiments described herein.

FIGS. 5A and 5B show a valve-gated embodiment of the present invention. The features and aspects described for the other embodiments may be used accordingly with the present embodiment. Reference numerals from FIGS. 1 and 2 are used to indicate like parts, and the relevant description can be referenced.

Extending through a valve-gated nozzle 500 is a valve pin 502 that can be rotated and translated as indicated by the arrows. FIG. 5A shows valve pin 502 in a closed position seated in mold gate 122, and FIG. 5B shows valve pin 502 in an open position away from mold gate 122. Nozzle 500 can be adapted for use in an injection molding apparatus, such as the injection molding apparatus 100 shown in FIG. 1.

Valve pin 502 is similar to pin 158 of FIG. 2 with the exception that, rather than having a torpedo tip, valve pin 502 has a downstream portion 504 rotatably connected at 508 to an upstream portion 506. Rotatable connection 508 may be any connection that prohibits axial movement between upstream portion 506 and downstream portion 504 but does not restrain rotation between upstream portion 506 and downstream portion 504. In the embodiment shown, downstream portion 504 includes a ball extending from its upstream end that is disposed in a socket in the downstream end of upstream portion 506, however, other connections may be used. The tip of downstream portion 504 closes mold gate 122. Upstream portion 506 engages impeller 204 and rotates within stabilizing collar 216 of impeller assembly 156, as discussed with respect to the embodiment of FIG. 2. When valve pin 502 is moved forward to close mold gate 122, rotatable connection 508 allows upstream portion 506 to rotate while downstream portion 504 remains stationary and engaged with mold gate 122, as shown in FIG. 5A. It would be understood by those skilled in the art that, in certain embodiment, forward movement of valve pin 502 opens mold gate 122 and rearward movement of valve pin 502 closes mold gate 122.

The non-circular cross-section of valve pin 502, as indicated at 510, engages non-circular opening 224 in impeller 204 and allows valve pin 502 to translate relative to impeller 204. This is shown in FIG. 5B where the valve pin 502 is translated rearward to open mold gate 122 while remaining in rotational engagement with impeller 204. As such, impeller 204 can also be rotated while mold gate 122 is open.

As evident from the above, valve pin 502 is movable along its length independent of the rotational motion of impeller 204. Likewise, impeller 204 can rotate independent of the axial movement of valve pin 502, impeller 204 being held against such axial motion by the engagement of outer ring 230 of impeller 204 in track 212. In a method of operating an injection molding apparatus, valve pin 502 opens and closes mold gate 122 as desired, while impeller 204 may be simultaneously rotated in either direction.

Figure 6:
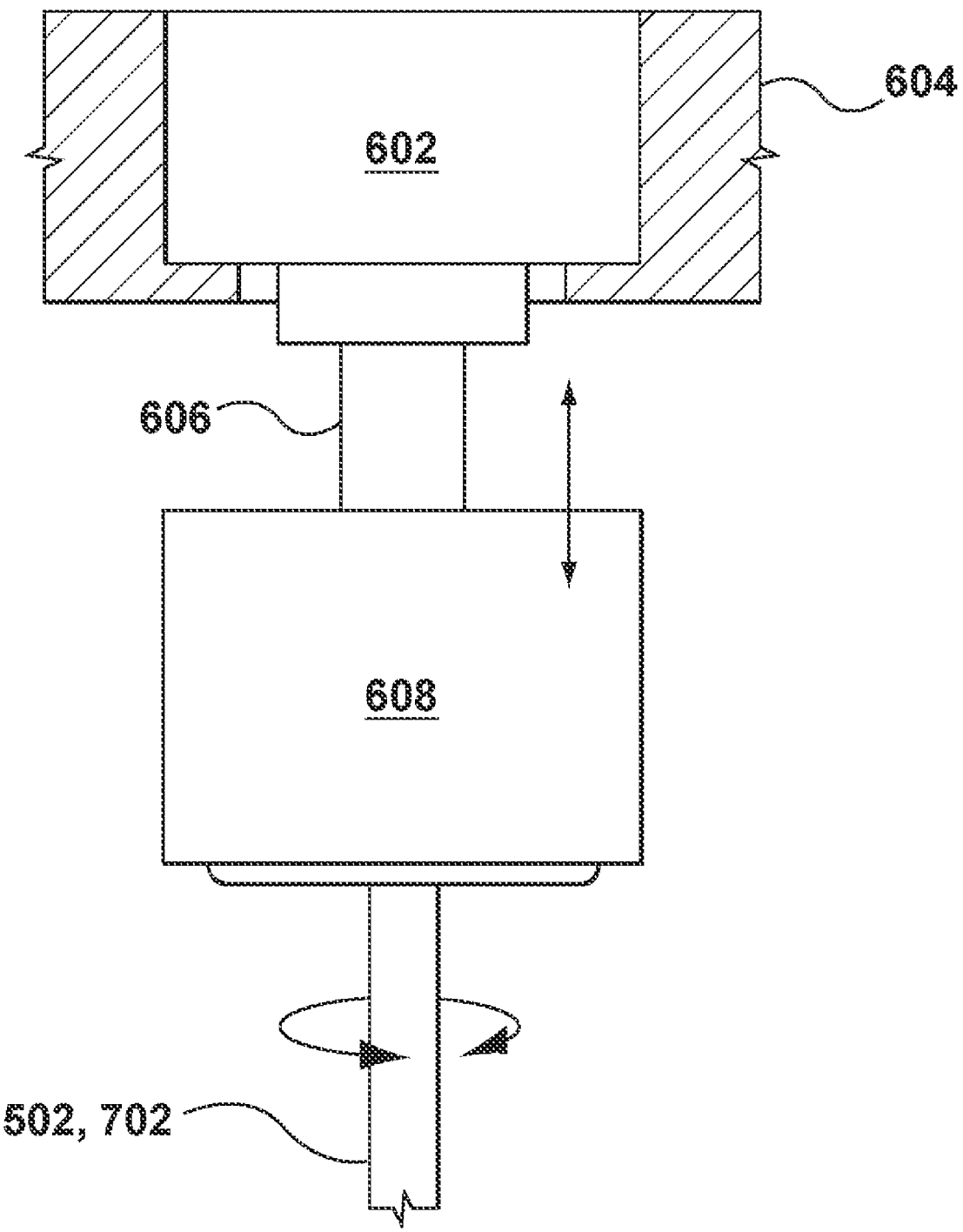
FIG. 6 is a simplified view of a motor-actuator assembly capable of translating and rotating a valve pin according to the present invention.

FIG. 6 shows a motor-actuator assembly capable of translating and rotating valve pins, such as those shown in FIGS. 5A, 5B, 7A, 7B, 12A, and 12B. An actuator 602, such as a pneumatic, hydraulic, or electric actuator, is situated in a back plate 604. An elongate translating part 606 of actuator 602 is connected to the housing of a motor 608. Elongate translating part 606 may be an extension of a pneumatic or hydraulic piston or a solenoid core. A valve pin 502, 702 is connected to the rotating part of motor 608. Valve pin 502, 702 can thus be rotated and translated independently and simultaneously, as indicated by the arrows.

Figure 7B:
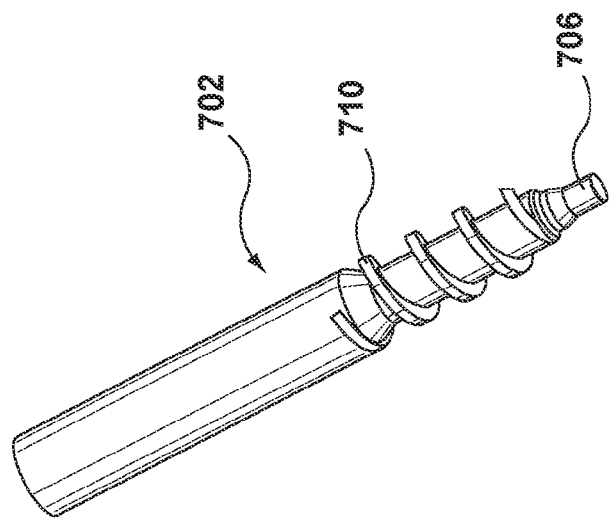
FIG. 7B is a perspective view of the valve pin of FIG. 7A
Figure 7A:
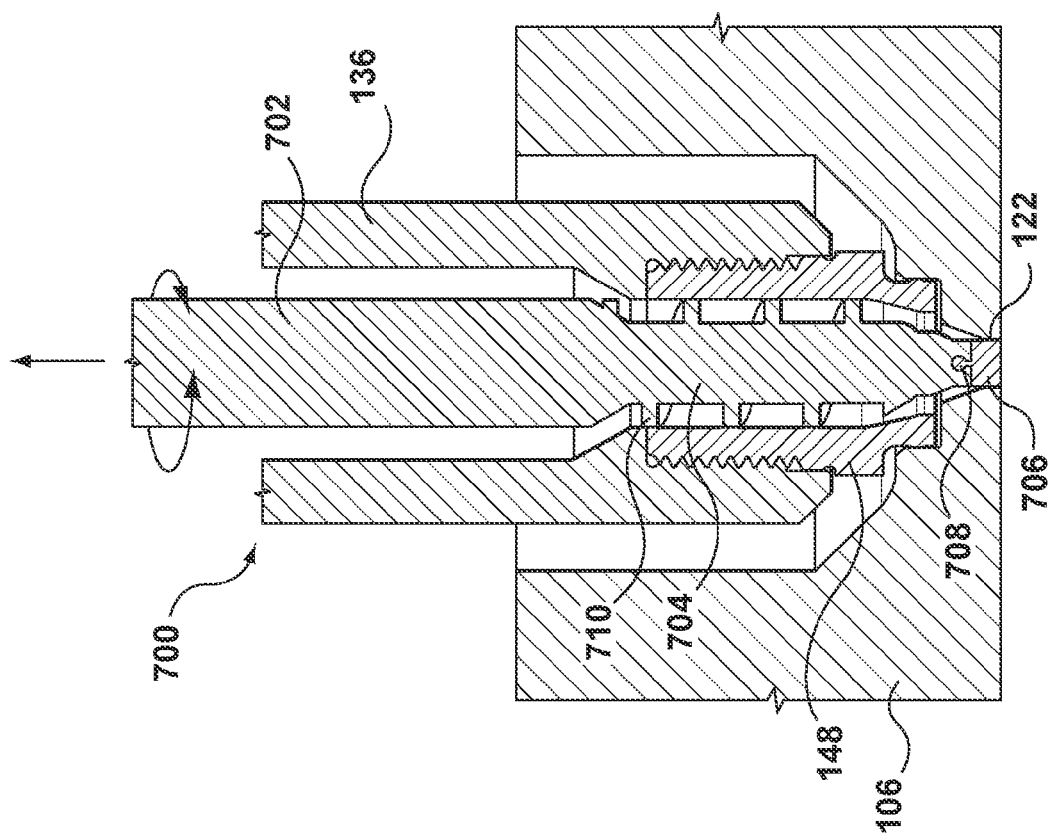
FIG. 7A is a partial sectional view of another valve-gated embodiment of the present invention.

FIGS. 7A and 7B show another valve-gated embodiment of the present invention that may be adapted for use in an injection molding apparatus such as the injection molding apparatus 100 in FIG. 1. The features and aspects described for the other embodiments may be used accordingly with the present embodiment. Reference numerals from FIG. 1 are used to indicate like parts, and the relevant description can be referenced.

Extending through a valve-gated nozzle 700 is a valve pin 702 that can be independently rotated and translated as indicated by the arrows. Nozzle 700 can be used in an injection molding apparatus, such as that shown in FIG. 1.

Valve pin 702 includes a downstream gate portion 706 rotatably connected to an upstream portion 706 at a rotatable connection 708. Rotatable connection 708 can be the rotatable connection 508 described above with respect to FIGS. 5A and 5B, or any other suitable rotatable connection. When valve pin 702 is moved forward, tip 706 seats in mold gate 122 to close mold gate 122, rotatable connection 708 allows upstream portion 704 to rotate while allowing tip 706 to remain stationary and engaged with mold gate 122.

A helical screw 710 which forms a screw-like structure is fixed to upstream portion 704 of valve pin 702. Helical screw 710 translates when valve pin 702 is moved rearward or forward to open or close mold gate 122, and rotates with upstream portion 704 when upstream portion 704 is rotated. In another embodiment, there is not a rotatable connection between upstream portion 704 and tip 706 such that the entire valve pin rotates.

As in the other embodiments, the direction and timing of the translation of valve pin 702 between an open and closed position and direction and timing of the rotation of helical screw 710 can be coordinated to have a desired effect on the molding material. For example, in a method of operating an injection molding apparatus, valve pin 702 is translated to open or close mold gate 122. At the same time, valve pin 702 is rotated to rotate helical screw 710 to increase or decrease pressure between helical screw 710 and mold gate 122. Although helical screw 710 pushes molding material due to its translating mode of movement, that is, helical screw 710 would push molding material even if not rotating, helical screw 710 can be rotated at speeds that move more molding material via its rotational mode of movement. For example, if valve pin 702 is translated forward to close mold gate 122, helical screw 710 would tend to push molding material downstream and into the mold gate 122. However, if helical screw 710 is simultaneously rotated fast enough in a direction to tend to drive molding material upstream, the net effect can be decompression between helical screw 710 and mold gate 122. Alternatively helical screw 710 can be rotated to increase the pressure of the melt within the melt channel before valve pin 702 is retracted to open the mold gate to facilitate faster filling of the mold cavity.

FIGS. 12A and 12B show another valve-gated embodiment of the present invention. The features and aspects described for the other embodiments may be used accordingly with the present embodiment. Reference numerals from FIG. 1 are used to indicate like parts, and the relevant description can be referenced.

Extending through a valve-gated nozzle 1200 is a valve pin 1202 and an impeller sleeve 1206. Valve pin 1202 can be translated rearward and forward independently of impeller sleeve 1206 and impeller sleeve 1206 can be rotated independently of valve pin 1202. Nozzle 1200 can be adapted for use in an injection molding apparatus, such the injection molding apparatus 100 in FIG. 1.

Valve pin 1202 includes a tip 1204 at a downstream end thereof to close mold gate 122. Valve pin 1202 is moved forward to seat tip 1204 in mold gate 122 to close mold gate 122 and valve pin 1202 is moved rearward to space tip 1204 away from mold gate 122 to open mold gate 122.

Valve pin 1202 is disposed through a bore 1210 in impeller sleeve 1206. Bore 1210 is sized to provide sufficient clearance between an outside surface of valve pin 1202 and an inside surface of impeller sleeve 1206, taking into account thermal expansion due to operating conditions, such that valve pin 1202 may translate freely within bore 1210 and impeller sleeve 1206 may rotate freely about valve pin 1202, but not allow melt to enter between valve pin 1202 and impeller sleeve 1206.

A helical screw 1208 is fixed to impeller sleeve 1206. Helical screw 1208 can rotate with impeller sleeve 1206 independently of valve pin 1202 when valve pin 1202 is translated rearward or forward to open or close mold gate 122.

Valve pin 1202 is coupled at its rearward portion to an actuator (not shown), for example actuator 602 shown in FIG. 6. Impeller sleeve 1206 is coupled at is rearward portion to a motor (not shown), for example motor 608 of FIG. 6, independent of valve pin 1202.

In an embodiment, a colorant may be added to the melt stream upstream of vane 1208 within the nozzle channel to provide decorative coloring to the finished part.

As described in the other embodiments herein, the direction and timing of the translation of valve pin 1202 and direction and timing of the rotation of helical screw 1208 of impeller sleeve 1206 can be coordinated to have a desired effect on the molding material.

Figure 8:
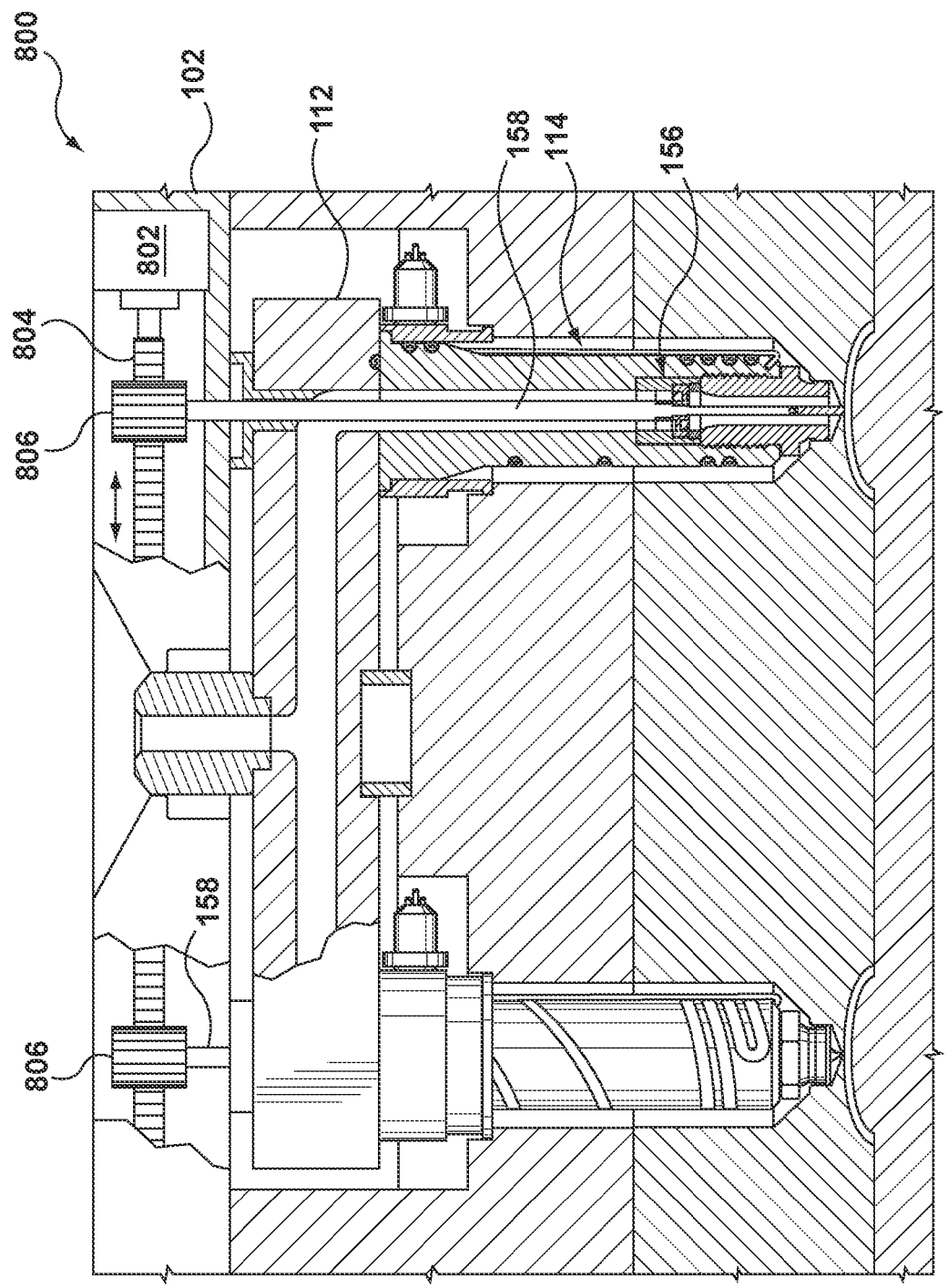
FIG. 8 is a partial sectional view of an injection molding apparatus having a rack and pinion according to another embodiment of the present invention.

FIG. 8 shows an injection molding apparatus 800 having a rack and pinion according to another embodiment of the present invention. The features and aspects described for the other embodiments may be used accordingly with the present embodiment. The injection molding apparatus 800 is similar to the injection molding apparatus 100 of FIG. 1 except for differences discussed below.

A linear motor 802, such as a linear induction motor or an actuator, for example actuator 602 of FIG. 6, is provided in back plate 102. A gear rack 804 is connected to the movable part of linear motor 802. Pinions 806 are connected to pins 158 and engage teeth on gear rack 804. In the embodiment shown, two pinions 806 engage gear rack 804, and a single motor 802 moves rack 806 such that both pinions 806 are rotated by motor 802. Pins 158 are connected to impeller assemblies 156. Rack 804 and pinions 806 thus couple impeller assemblies 156 to linear motor 802, such that when linear motor 802 moves gear rack 804 back and forth, as indicated by the arrow, the vanes of impeller assemblies 156 rotate in unison. As such, a plurality of impellers, screws, or other vane-carrying devices can be controlled by a common motor.

In another embodiment, a rotational motor, for example motor 160 of FIG. 1, is coupled to a plurality of impellers or screws via a belt and cog assembly or other mechanical transmission.

Figure 9:
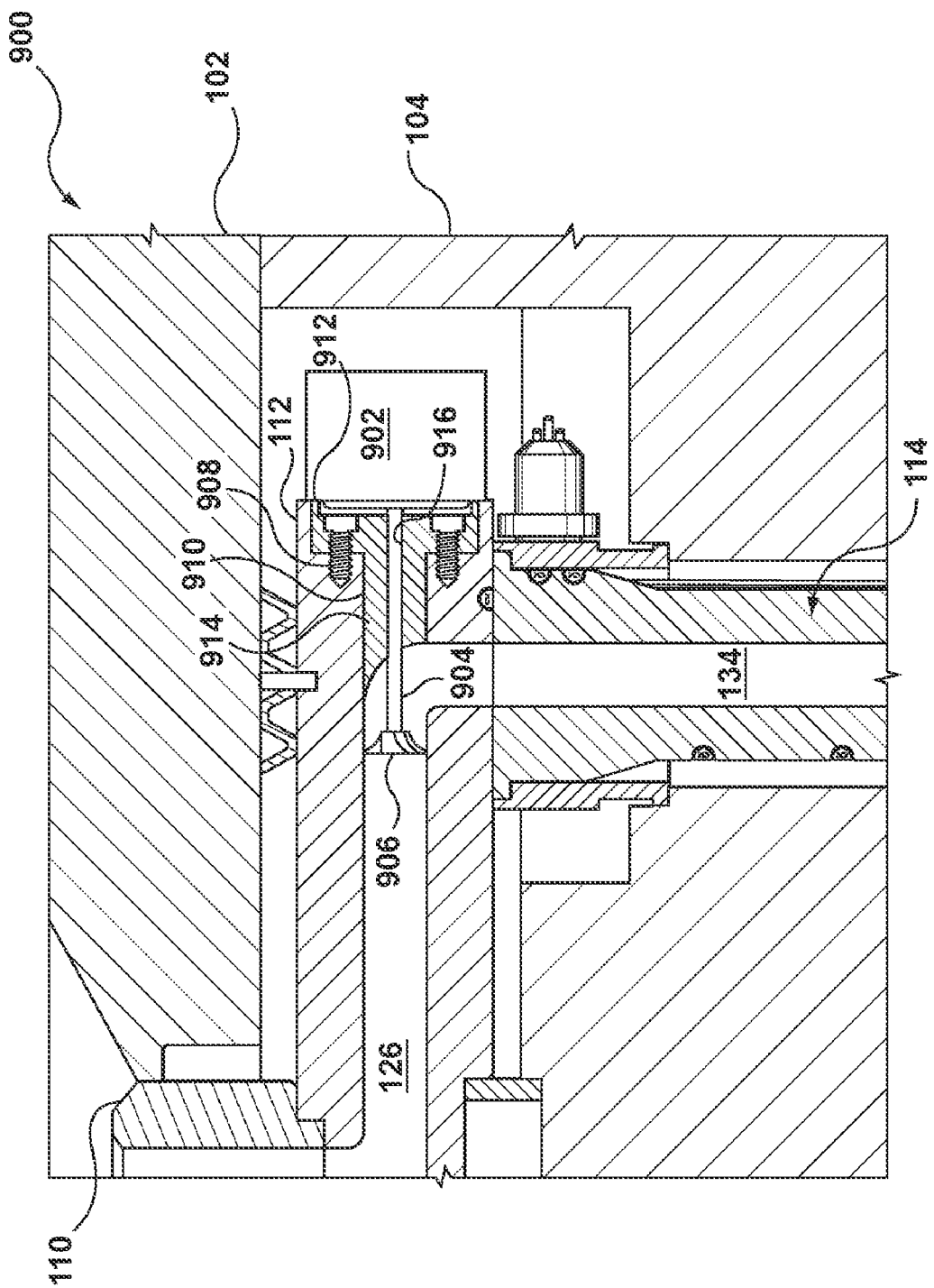
FIG. 9 is a partial sectional view of an injection molding apparatus having an impeller in a manifold channel according to another embodiment of the present invention.

FIG. 9 illustrates an injection molding apparatus 900 having an impeller in a manifold channel according to another embodiment of the present invention. The features and aspects described for the other embodiments may be used accordingly with the present embodiment. Injection molding apparatus 900 is similar the injection molding apparatus 100 of FIG. 1 except for differences discussed below.

Injection molding apparatus 900 includes a motor 902 coupled to a side of manifold 112, by bolts 908 or similar connection. A bushing 910 is disposed between motor 902 and manifold 112. Bushing 910 includes a disc-shaped main body 912 and a cylindrical bushing portion 914 connected to and extending from main body 912 and into manifold 112. In the embodiment shown, bolts 908 extend through disc-shaped main body 912 and into manifold 112. Bushing 910 includes a bore 916. A pin 904 extends from motor 902, through bore 916, and into manifold channel 126, which forms part of the flow channel. Bore 916 of bushing 910 creates a seal with pin 904 while still allowing pin 904 to rotate. An impeller 906 having one or more vanes is fixed to pin 904. Motor 902 can rotate impeller 906 in either direction to affect the flow of molding material as discussed elsewhere herein.

Figure 10:
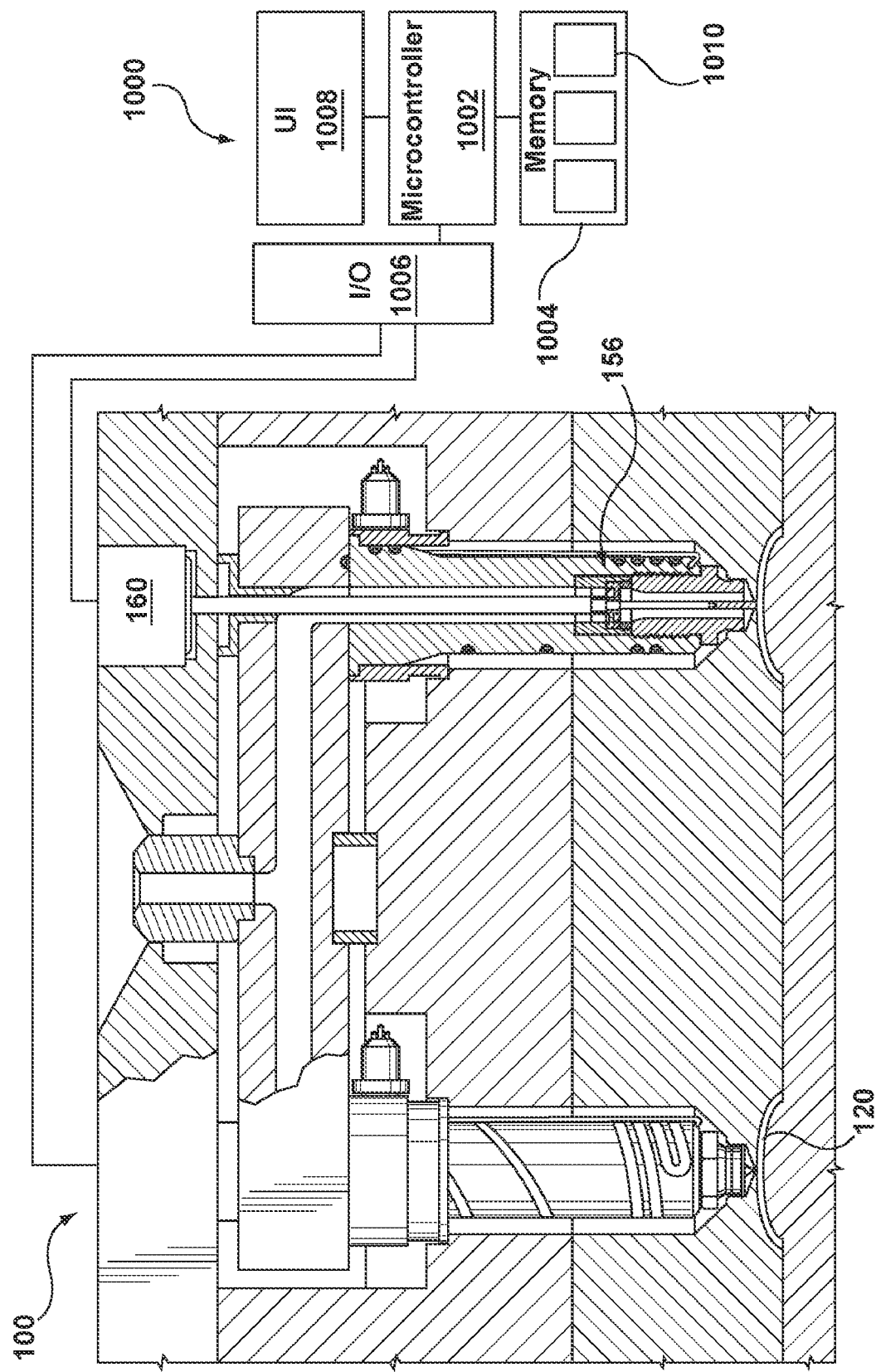
FIG. 10 is a schematic view of a controller for controlling an injection molding apparatus according to the present invention.

FIG. 10 illustrates an open-loop controller 1000 for controlling an injection molding apparatus according to the present invention. The features and aspects described for the other embodiments can be used accordingly with the present embodiment. Controller 1000 can be used to control any of the injection molding apparatuses described herein, such as the injection molding apparatus 100 depicted.

Controller 1000 includes a microcontroller 1002, memory 1004, an input/output module 1006, and a user interface 1008. Controller 1000 may be a standalone controller, as depicted, or integrated into a hot-runner controller or injection molding machine controller. Microcontroller 1002, memory 1004, input/output module 1006, and circuit portion of the user interface 1008 may be disposed on separate IC boards or chips, or may be integrated onto common IC board(s) or chip(s). In another embodiment, controller 1000 is implemented as an executable program installed on a computer.

Microcontroller 1002 controls the on/off times, on/off durations, and/or rotational speeds of the impellers of impeller assemblies 156, screws, or other vane-carrying devices. In the valve-gated embodiments described herein, microcontroller 1002 can control the opening and closing of mold gates 120 as well. These parameters can be individually controlled for each mold cavity or collectively controlled for some or all mold cavities 120. For example, the rotational speeds of the impellers can be set to different individual values or can be set to a single, common value. Microcontroller 1002 may be, for example, an 8-bit controller with built-in analog-to-digital converter and built-in EEPROM and internal clock. An 8-bit AT Mega 64 microcontroller made by Atmel Corporation of San Jose, Calif., is one example.

Memory 1004 stores one or more of the above-mentioned parameters, as selected by an operator or as a default setting. If microcontroller 1002 has suitable on-board memory, this may be used and memory 1004 may be omitted. Parameters can be selected to define injection profiles 1010 for each mold cavity or group of mold cavities 120. Profiles can be established for metering of molding material, packing, decompression, knit-line location in a large cavity mold fed by several nozzles, and/or mixing. The settings may be empirical and the parameters can be adjusted by an operator based on the observed or measured qualities of the molded products. For example, an operator may set the RPM of an impeller of a particular nozzle to increase by 20% during a packing phase of an injection cycle. In another example, the operator may set all impellers to turn off one second after the plasticizing screw finishes injecting molding material.

Input/output module 1006 connects and manages signals between microcontroller 1002 and motors 160. Input/output module 1006 may be omitted if motors 160 and microcontroller 1002 are able to communicate directly with each other. When controller 1000 is a standalone controller, input/output module 1006 can be connected to a hot-runner controller or injection molding machine controller to synchronize control of the impellers with the control of other components, such as the plasticizing screw or hot-runner nozzle/manifold heaters. In this way, microcontroller 1002 can be programmed to time changes in the control parameters to coincide with changes commanded by another controller. For example, input/output module 1006 receives a signal from an injection molding controller indicating that the plasticizing screw is being retracted, thereby triggering microcontroller 1002 to command rotation of the impellers to assist in decompression. Communication between input/output module 1006 and microcontroller 1002 can be multiplexed if the number of motors 160 is large.

User interface 1008 includes an input device, such as a keyboard/keypad or touch-screen, and an output device, such as a monitor or the same touch-screen. User interface 1008 may be omitted if the user interface of an injection molding machine, hot runner, or other controller is used or if control is preprogrammed and not modifiable by the operator.

Figure 11:
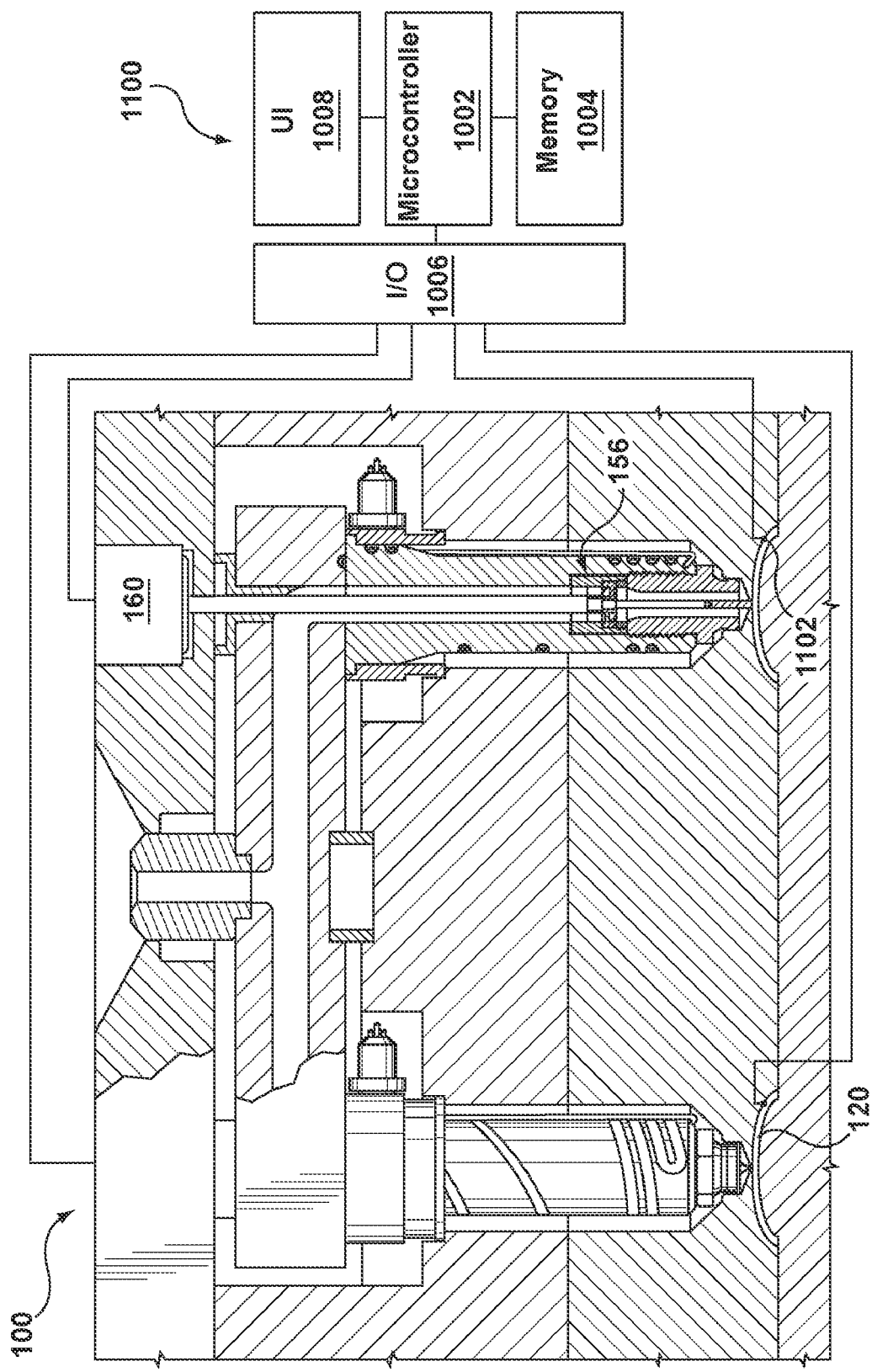
FIG. 11 is a schematic view of a controller connected to a sensor in an injection molding apparatus according to the present invention.

FIG. 11 illustrates a closed-loop controller 1100 connected to at least one sensor in an injection molding apparatus according to the present invention. The features and aspects described for the other embodiments can be used accordingly with the present embodiment. Controller 1100 can be used to control any of the injection molding apparatuses described herein, such as the injection molding apparatus 100 depicted. Reference numerals from FIG. 10 are used to indicate like parts, and the relevant description can be referenced.

Pressure sensors 1102 are placed in mold cavities 120 and output pressure signals to input/output module 1006. Based on pressure data from a previous cycle, the microcontroller 1002 can adjust the rotational parameters of impellers 204 of impeller assemblies 156 automatically. It would be understood by those skilled in the art that any of the impellers/impeller assemblies described in the above embodiments can be used in the present embodiment. In addition to metering, packing, decompression, knit-line location, and/or mixing, as mentioned above, this feedback system allows for real-time balancing of the injection molding apparatus 100, 800, 900. For example, if too low a pressure is detected in one mold cavity 120, the impeller speed can be increased for the next shot to increase filling/packing for the corresponding mold cavity 120. To achieve such feedback, a proportional-integral-derivative (PID) control scheme, such as the kind used for hot-runner nozzle temperature control, can be programmed into microcontroller 1002.

In another embodiment having a controller, pressure sensors are located in the nozzles to measure pressure of molding material therein. In yet another embodiment, temperature sensors are provided in the cavities to detect filling of the mold cavities by sensing the presence of heat of the molding material. Any kind of sensor capable of measuring a property of the molding material may be used. Output from these sensors is used by the controller to control the impellers, screws, or other vane-carrying devices.

In all embodiments, the motor can rotate the vane of the impeller, screw, or similar device in either direction during certain phases of the injection cycle. For example, during the injection phase of the cycle, the vane can be rotated to mix molding material before it enters the mold cavity. Mixing can break up flow lines sufficiently to minimize the knit-line effect. Rotating the vane during the injection phase of the cycle can also help remove stagnant material and aid in color changes. In another example, during a decompression phase the vane can be rotated to act as a localized axial pump that will help decompress the gate area. In a further example, the vane is rotated to increase pressure at the mold gate to pack molding material into the mold cavity. In a further example, the vane is rotated to compress the molding material prior to opening the mold gates to decrease injection time for faster filling of the mold cavities.

Materials and manufacturing techniques for making the embodiments of the present invention described herein may be those used in the injection molding industry and related industries.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus, comprising:
a manifold defining a manifold channel for receiving pressurized molding material from an upstream source;
a nozzle defining a nozzle channel having a logitudinal axis in communication with the manifold channel to define a flow channel, the nozzle being associated with a mold gate of a mold cavity, the nozzle for delivering molding material to the mold gate;
an impeller having at least one vane, the impeller rotatably disposed in the flow channel upstream of the mold gate, the impeller being fixed relative to the longitudinal axis, wherein the vane is configured such that the impeller is not a positive displacement device; and
a motor coupled to the impeller for rotating the impeller.

2. The injection molding apparatus of claim 1 further comprising a pin coupling the motor to the impeller.

3. The injection molding apparatus of claim 2, wherein the pin has a portion of non-circular cross-section that engages a corresponding non-circular opening in the impeller.

4. The injection molding apparatus of claim 3, wherein the pin is a valve-pin for opening and closing the mold gate, and wherein the pin is translatable relative to the impeller.

5. The injection molding apparatus of claim 4, further comprising a bushing coupled to the nozzle, wherein the bushing includes fins extending radially from an inside wall of the bushing towards a centerline of the bushing to hold a hollow cylindrical collar,
wherein the impeller includes a hub having the non-circular opening for engaging the pin, wherein the at least one vane extends radially outward from the hub and has an end connected to an outer ring, wherein the bushing defines an inside track in which the outer ring of the impeller rotatably resides.

6. The injection molding apparatus of claim 4, wherein the pin includes an upstream portion and a downstream portion coupled to the upstream portion such that the upstream portion can rotate relative to the downstream portion, wherein the upstream portion includes the non-circular cross section for engaging the corresponding non-circular opening in the impeller, and the downstream portion includes a tip for opening and closing the mold gate.

7. An injection molding apparatus, comprising:
a manifold defining a manifold channel for receiving pressurized molding material from an upstream source;
a nozzle defining a nozzle channel having a longitudinal axis in communication with the manifold channel to define a flow channel, the nozzle associated with a mold gate of a mold cavity, the nozzle for delivering molding material to the mold gate;
a vane rotatably disposed in the flow channel upstream of the mold gate, wherein the vane is fixed relative to the longitudinal axis;
a motor coupled to the vane for rotating the vane; and
a valve pin extending through the nozzle, wherein the valve pin is translatable within the nozzle channel to open and close the mold gate, wherein the valve pin is translatable relative to the vane.

8. The injection molding apparatus of claim 7, further comprising a bushing coupled to the nozzle, wherein the bushing includes fins extending radially from an inside wall of the bushing towards a centerline of the bushing to hold a hollow cylindrical collar,
wherein the vane extends radially from a hub having a non-circular opening for engaging a corresponding non-circular portion of the valve pin, wherein the vane has an end connected to an outer ring, and wherein the bushing defines an inside track in which the outer ring rotatably resides.

9. The injection molding apparatus of claim 7, wherein the pin includes an upstream portion and a downstream portion coupled to the upstream portion such that the upstream portion can rotate relative to the downstream portion, wherein the upstream portion includes a non-circular cross section for engaging a corresponding non-circular opening in a hub from which the vane extends, and the downstream portion includes a tip for opening and closing the mold gate.

10. The injection molding apparatus of claim 7, wherein the vane is fixed to an impeller sleeve and the valve pin is disposed in a bore of the impeller sleeve such that the valve pin is translatable relative to the impeller sleeve and the impeller sleeve is rotatable relative to the valve pin.

11. The injection molding apparatus of claim 10, wherein the motor is coupled to the impeller sleeve and an actuator is coupled to the valve pin.

12. The injection molding apparatus of claim 10, wherein the vane is a helical screw.

* * * * *